(12) United States Patent
Ge et al.

(10) Patent No.: US 9,239,496 B2
(45) Date of Patent: Jan. 19, 2016

(54) DISPLAY WITH COLUMN SPACER STRUCTURES FOR ENHANCED LIGHT LEAKAGE AND POOLING RESISTANCE

(71) Applicant: Apple Inc., Cupertino, CA (US)

(72) Inventors: Zhibing Ge, Sunnyvale, CA (US); Cheng Chen, San Jose, CA (US); Enkhamgalan Dorjgotov, San Francisco, CA (US); Jun Qi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 124 days.

(21) Appl. No.: 13/861,231

(22) Filed: Apr. 11, 2013

(65) Prior Publication Data
US 2014/0307207 A1    Oct. 16, 2014

(51) Int. Cl.
*G02F 1/1339* (2006.01)

(52) U.S. Cl.
CPC .. *G02F 1/13394* (2013.01); *G02F 2001/13396* (2013.01); *G02F 2001/13398* (2013.01)

(58) Field of Classification Search
CPC ................. G02F 1/13394; G02F 2001/13396; G02F 2001/13398
USPC .................................................. 349/155, 157
See application file for complete search history.

(56) References Cited

U.S. PATENT DOCUMENTS

| | | | | |
|---|---|---|---|---|
| 6,016,181 A * | 1/2000 | Shimada | ........................ | 349/156 |
| 7,256,859 B2 | 8/2007 | Kim et al. | | |
| 7,623,212 B2 | 11/2009 | Lee | | |
| 7,812,918 B2 * | 10/2010 | Choi et al. | ..................... | 349/156 |
| 8,081,286 B2 | 12/2011 | Kim et al. | | |
| 2008/0182351 A1 * | 7/2008 | Sawasaki | ............ | G02F 1/13394 438/30 |
| 2008/0297715 A1 | 12/2008 | Oh | | |
| 2009/0058826 A1 | 3/2009 | Lee et al. | | |
| 2009/0059155 A1 | 3/2009 | Nakayama et al. | | |
| 2011/0156039 A1 * | 6/2011 | Baek et al. | ....................... | 257/59 |
| 2011/0228190 A1 * | 9/2011 | Yang | ................... | G02F 1/13394 349/56 |
| 2012/0008080 A1 * | 1/2012 | Daishi | .......................... | 349/138 |
| 2013/0169913 A1 * | 7/2013 | Choi et al. | ..................... | 349/110 |

FOREIGN PATENT DOCUMENTS

TW          200921217          5/2009

OTHER PUBLICATIONS

Lee et al., U.S. Appl. No. 13/741,138, filed Jan. 14, 2013.

* cited by examiner

*Primary Examiner* — Nathanael R Briggs
(74) *Attorney, Agent, or Firm* — Treyz Law Group, P.C.; G. Victor Treyz; Joseph F. Guihan

(57) ABSTRACT

A display may have a layer of liquid crystal material between a color filter layer and a thin-film transistor layer. Column spacer structures may be formed between the color filter layer and the thin-film transistor layer to maintain a desired separation between the color filter and thin-film transistor layers. The column spacer structures may be formed from polymer structures such as photoresist pillars and may include metal pads. The metal pads may be formed on the upper surface of the thin-film transistor layer or the lower surface of the color filter layer. The photoresist pillars may be formed on a surface in the display such as the lower surface of the color filter layer. Column spacer structures may include main spacer structures, subspacer structures, and intermediate thickness spacer structures to enhance pooling mura and light leakage performance.

19 Claims, 12 Drawing Sheets

|  | MAIN COLUMN SPACERS | INTERMEDIATE COLUMN SPACERS | SUBSPACER COLUMN SPACERS |
|---|---|---|---|
| % OF AREA | 0.002-0.1 OR 0.004-0.05 | 0.001-0.05 OR 0.002-0.025 (E.G., 0.025%) | 0.5-2 OR 1-2 |
| HEIGHT | 2-3.5 μm (+ 0.1-0.5 μm FOR LANDING PAD) | 1.8-3.9 μm | 1.7-3.5 μm |
| Δ | 0 | 0.05-0.2 μm | 0.3-0.6 μm |

FIG. 12

DISPLAY WITH COLUMN SPACER STRUCTURES FOR ENHANCED LIGHT LEAKAGE AND POOLING RESISTANCE

BACKGROUND

This relates generally to electronic devices, and more particularly, to electronic devices with displays.

Electronic devices often include displays. For example, cellular telephones and portable computers often include displays for presenting information to a user.

Liquid crystal displays contain a layer of liquid crystal material. Display pixels in a liquid crystal display contain thin-film transistors and electrodes for applying electric fields to the liquid crystal material. The strength of the electric field in a display pixel controls the polarization state of the liquid crystal material and thereby adjusts the brightness of the display pixel.

Substrate layers such as color filter layers and thin-film transistor layers are used in liquid crystal displays. The thin-film transistor layer contains an array of the thin-film transistors that are used in controlling electric fields in the liquid crystal layer. The color filter layer contains an array of color filter elements such as red, blue, and green elements. The color filter layer provides the display with the ability to display color images.

In an assembled display, the layer of liquid crystal material is sandwiched between the thin-film transistor layer and the color filter layer. Polyimide passivation layers cover the inner surface of the color filter layer and the upper surface of the thin-film transistor layer. An array of column spacers is formed on the inner surface of the color filter layer to maintain a desired gap between the color filter layer and the thin-film transistor layer. Column spacers are typically formed from hard organic materials such as photoresist.

There are typically two types of column spacers in a liquid crystal display. A relatively sparse set of main column spacers extends between the color filter layer and the thin-film transistor layer. The thickness of the column spacers and their associated landing pads establishes the amount of separation between the color filter layer and the thin-film transistor layer. Another set of column spacers, referred to as subspacers, has structures that extend only partway between the color filter layer and the thin-film transistor layer. Subspacers are used to prevent the thin-film transistor layer and column spacer from contacting one another. The subspacers do not extend all the way between the color filter layer and thin-film transistor layer to accommodate deformation of the color filter layer relative to the thin-film transistor upon a drop in ambient temperature for the display.

There are tradeoffs involved when determining an appropriate number column spacers to use in a given display. If too few of the main column spacers are provided, there will be insufficient support for the display. This will make the display susceptible to an undesirable visual effect called pooling mura. If too many of the main column spacers are provided, the display will become overly stiff. This will make the display prone to stress-induced birefringence when deformed, leading to undesired light leakage effects. With existing column spacer designs, it can be challenging to identify an acceptable tradeoff between pooling and light leakage. Displays are often sensitive to manufacturing variations and may exhibit more pooling and light leakage effects than desired.

It would therefore be desirable to be able to provide a display with an improved column spacer configuration.

SUMMARY

A display may have a color filter layer with opposing upper and lower surfaces and a thin-film transistor layer with opposing upper and lower surfaces. A layer of liquid crystal material may be located between the lower surface of the color filter layer and the upper surface of the thin-film transistor layer.

Column spacer structures may be formed between the color filter layer and the thin-film transistor layer to maintain a desired separation between the color filter layer and the thin-film transistor layer. The column spacer structures may be formed from polymer structures such as photoresist pillars and may include pads such as metal pads. The metal pads may be formed on the upper surface of the thin-film transistor layer or the lower surface of the color filter layer. The photoresist pillars may be formed on a surface in the display such as the lower surface of the color filter layer.

Column spacer structures may include main spacer structures, subspacer structures, and one or more different types of intermediate thickness spacer structures. The use of the intermediate thickness spacer structures may simultaneously improve pooling mura performance and light leakage performance.

Further features of the invention, its nature and various advantages will be more apparent from the accompanying drawings and the following detailed description of the preferred embodiments.

BRIEF DESCRIPTION OF THE DRAWINGS

FIG. 12 is a table of illustrative column spacer characteristics that may be used in a column spacer arrangement in accordance with an embodiment of the present invention.

DETAILED DESCRIPTION

Electronic devices may include displays. The displays may be used to display images to a user. Illustrative electronic devices that may be provided with displays are shown in FIGS. 1, 2, 3, and 4.

Figure 1:
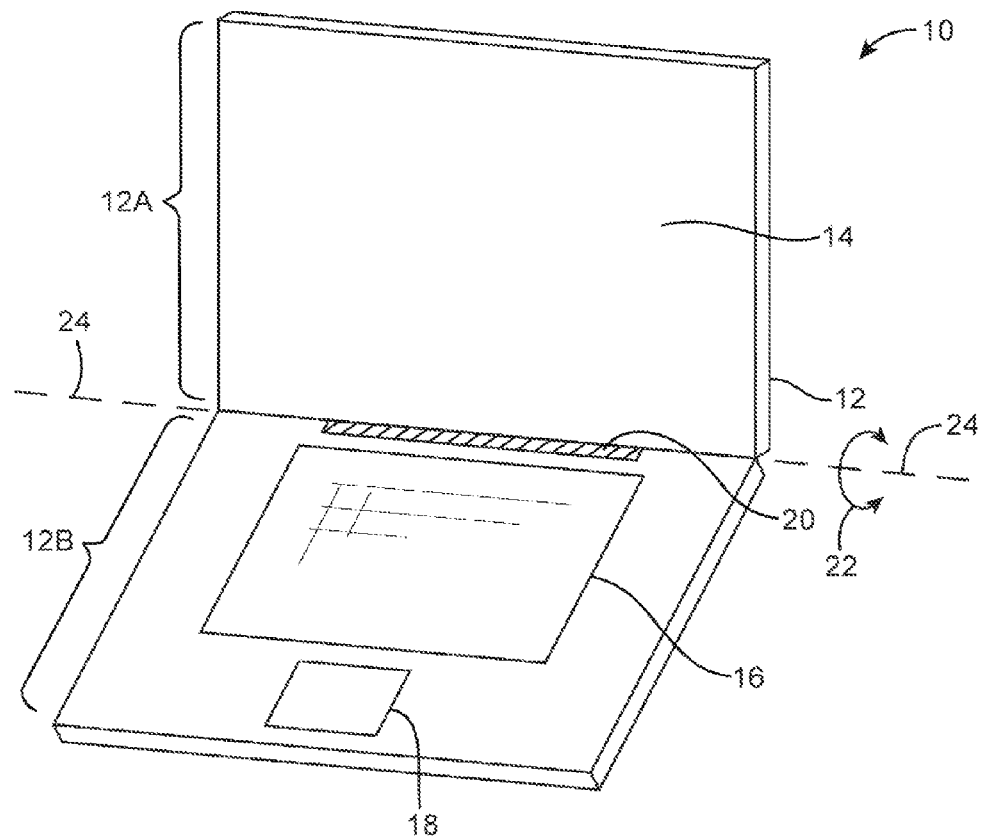
FIG. 1 is a perspective view of an illustrative electronic device such as a laptop computer with a display in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
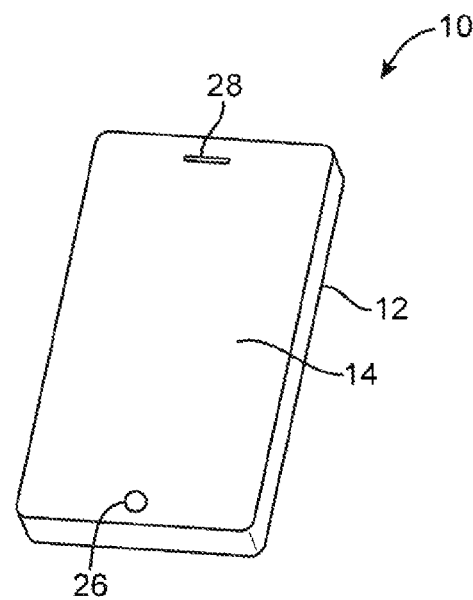
FIG. 2 is a perspective view of an illustrative electronic device such as a handheld electronic device with a display in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
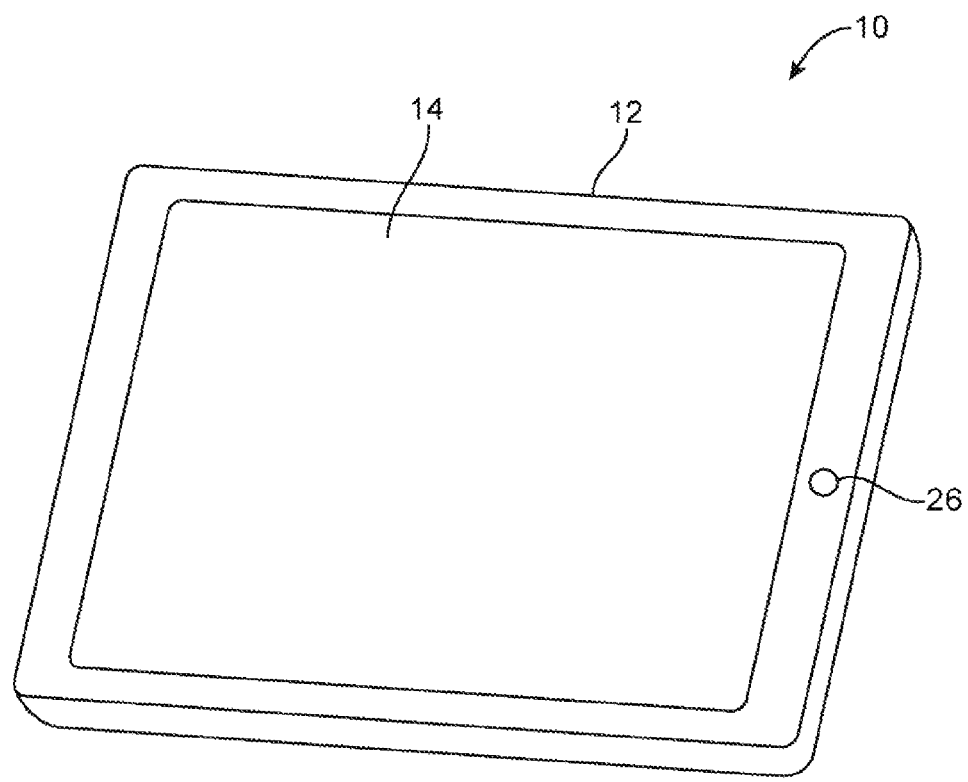
FIG. 3 is a perspective view of an illustrative electronic device such as a tablet computer with a display in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
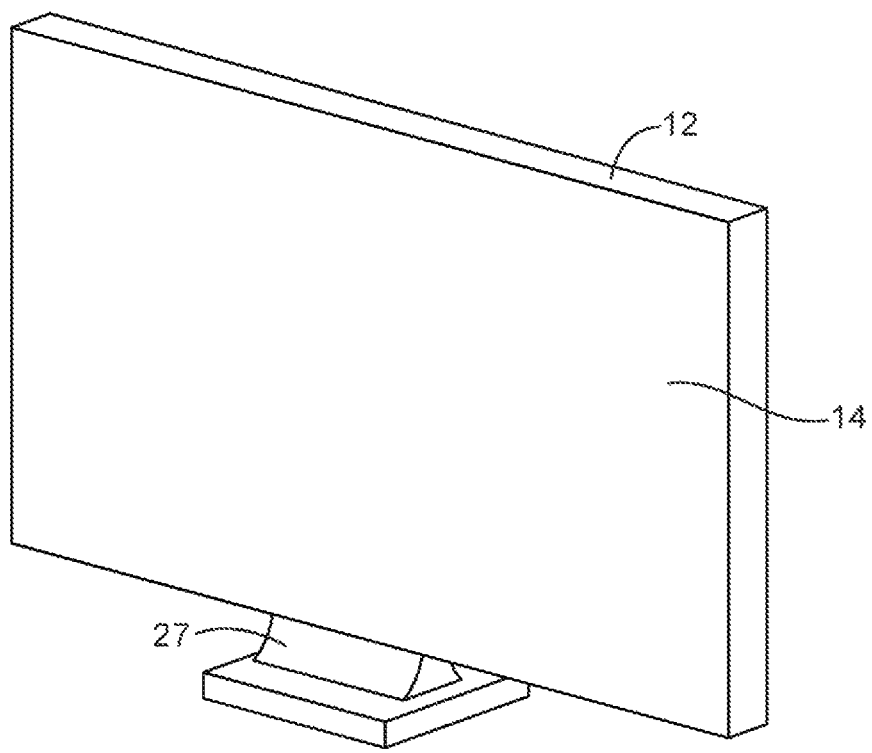
FIG. 4 is a perspective view of an illustrative electronic device such as a computer display with display structures in accordance with an embodiment of the present invention.

FIG. 4 shows how electronic device 10 may be a computer display or a computer that has been integrated into a computer display. With this type of arrangement, housing 12 for device 10 may be mounted on a support structure such as stand 27. Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 includes display pixels formed from liquid crystal display (LCD) components or other suitable image pixel structures.

A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Figure 5:
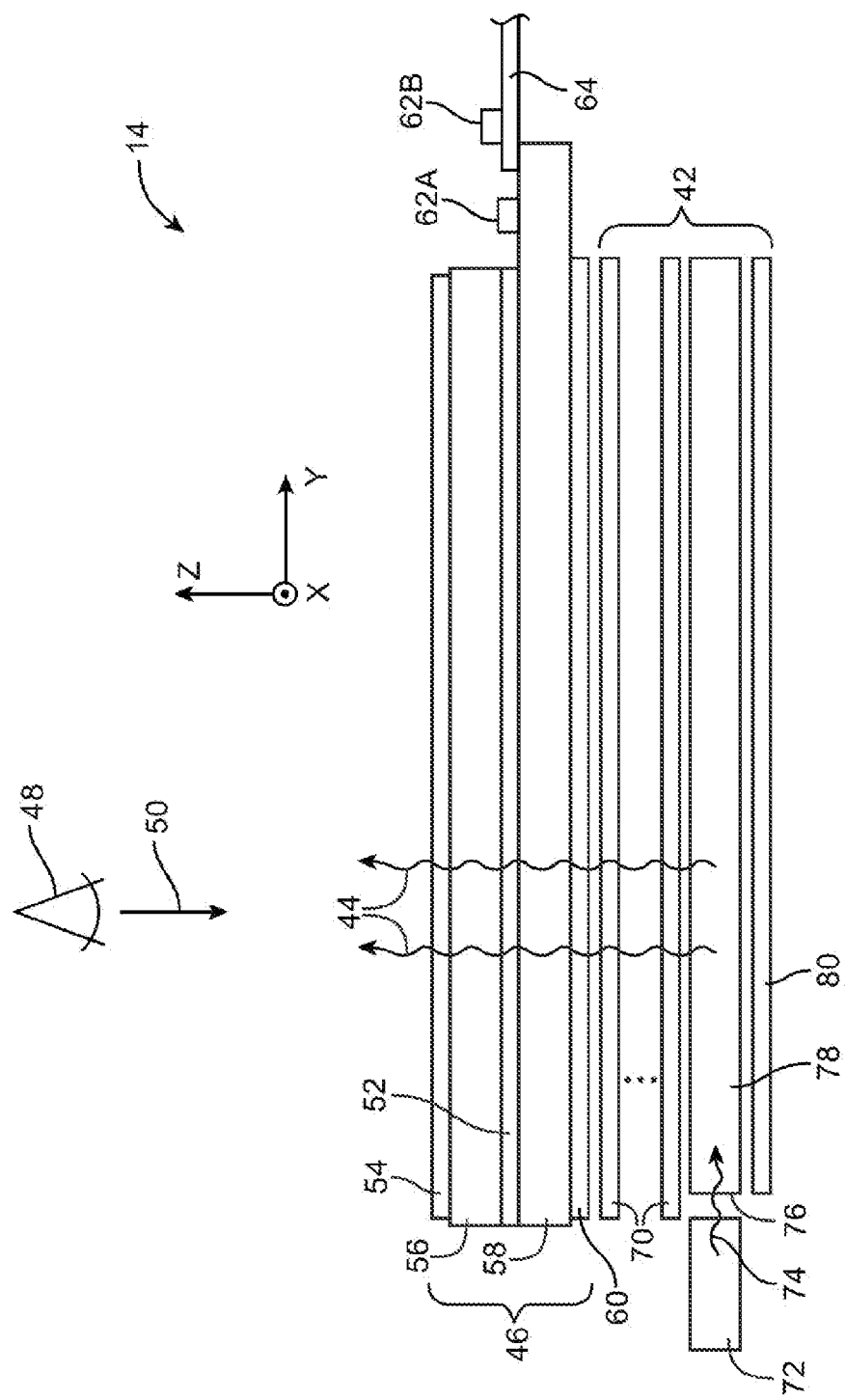
FIG. 5 is a cross-sectional side view of an illustrative display in accordance with an embodiment of the present invention.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

To maintain a desired gap for the liquid crystal material between the lower surface of color filter layer 56 and the upper surface of thin-film transistor layer 58, display 14 may be provided with column spacer structures (sometimes referred to as post spacers). The column spacer structures may be formed from column structures (e.g., cylindrical posts) and/or planar structures such as metal pads on the surfaces of color filter layer 56 and/or thin-film transistor layer 58.

Figure 6:
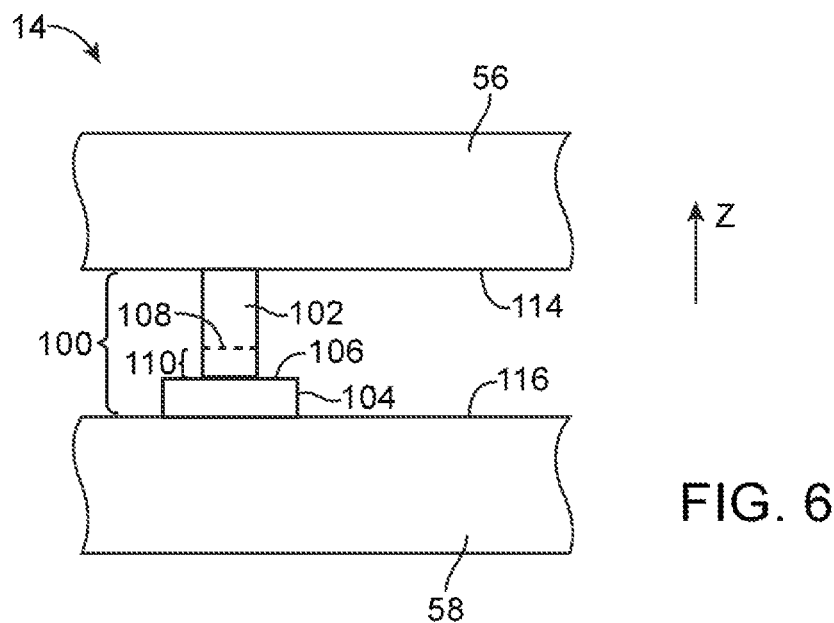
FIG. 6 is a cross-sectional side view of a portion of a display with a main column spacer that is supported by a landing pad on a thin-film transistor layer in accordance with an embodiment of the present invention.

FIGS. 6, 7, 8, and 9 are cross-sectional side views of a portion of display 14 in arrangements with different respective column spacer structures (sometimes referred to as column spacers). The arrangements of FIG. 6, 7, 8, or 9, other column spacer structures, and combinations of two or more of these configurations may be used in forming column spacer structures for display 14. In the example of FIG. 6, column spacer structures 100 extend between lower (innermost) surface 114 of color filter layer 56 and upper (outermost) surface 116 of thin-film transistor layer 58.

Column spacer structures 100 of FIG. 6 include column spacer 102 and landing pad 104. Column spacer structures such as column spacer 102 and other column spacers in display 14 may be formed from photoresist, other polymers, or non-polymer materials. Photolithographic fabrication techniques may be used to pattern column spacers on layers such as color filter layer 56. Landing pad 104 may be formed from an organic or inorganic material. As an example, landing pad 104 may be formed from metal. Both the thickness (vertical height in dimension Z) of landing pad 104 on surface 116 of thin-film transistor layer 58 and the thickness of column spacer 102 contribute to the total thickness of column spacer structures 100. If desired, column spacer 102 may extend only to position 108 so that a gap such as gap 110 may be formed between the lower surface of column spacer 102 of column spacer structures 100 and upper surface 106 of pad 104.

Figure 7:
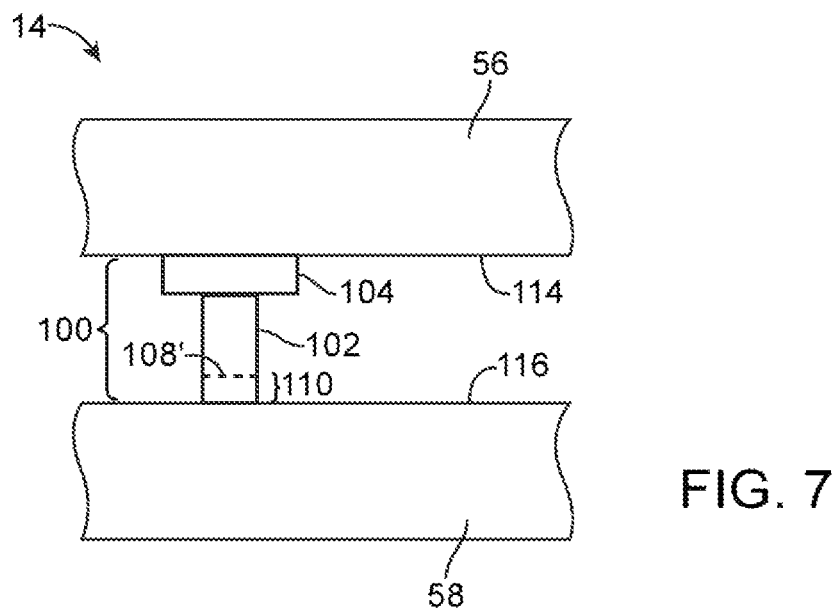
FIG. 7 is a cross-sectional side view of a portion of a display with a main column spacer that is supported by a pad on a color filter layer in accordance with an embodiment of the present invention.

If desired, column spacer structures 100 may be formed in display 14 using a configuration in which a pad (e.g., metal pad 104) is formed on lower surface 114 of color filter layer 56, as shown in FIG. 7. Column spacer 102 may be formed on top of pad 104. The total thickness of column spacer structures 100 in this scenario is made up of the thickness of pad 104 plus the thickness of column spacer 102. As with the illustrative configuration of FIG. 6, column spacer structures 100 of FIG. 7 may extend from lower surface 114 of color filter 56 to upper surface 116 of thin-film transistor layer 58 or may extend from surface 114 to position 108 so that a gap such as gap 110 is formed between the lower surface of column spacer structures 100 and upper surface 116 of thin-film transistor layer.

Figure 8:
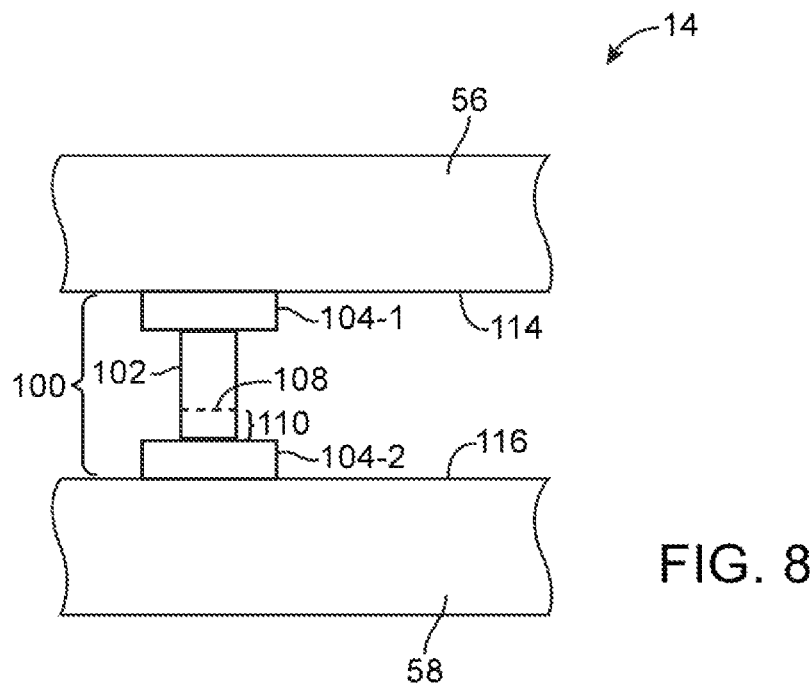
FIG. 8 is a cross-sectional side view of a portion of a display with a main column spacer that extends between a pad on a color filter layer and a pad on a thin-film transistor layer in accordance with an embodiment of the present invention.

In the illustrative arrangement of FIG. 8, pads such as metal pads have been formed above and below column spacer 102. In particular, metal pad 104-1 has been formed on surface 114 of color filter layer 56 and metal pad 104-2 has been formed on surface 116 of thin-film transistor layer 58. In this type of configuration, column spacer structures 100 may include a column spacer such as column spacer 102 that extends between metal pads 104-1 and 104-2 or a column spacer that extends from pad 104-1 to surface 108 to create gap 110 between the column spacer and the upper surface of pad 104-2.

Figure 9:
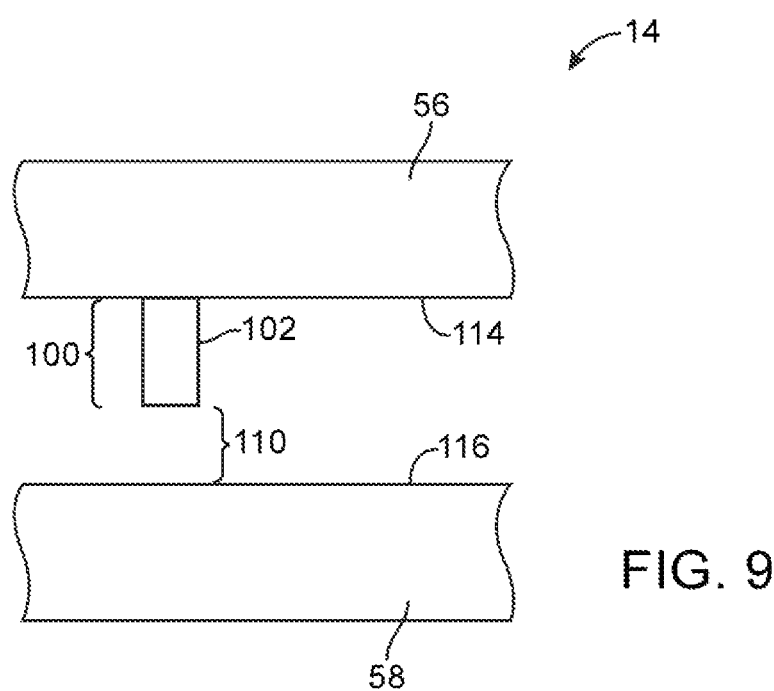
FIG. 9 is a cross-sectional side view of a portion of a display with a column spacer formed on a color filter layer and separated from a thin-film transistor layer by a gap in accordance with an embodiment of the present invention.

As shown in FIG. 9, column spacer structures 100 may include a column spacer such as column spacer 102 that is formed directly on surface 114 of color filter layer 56. Mating landing pads need not be provided on surface 116 of thin-film transistor layer 58. Gap 110 may separate the lower surface of column spacer 102 from upper surface 116 of thin-film transistor layer 58.

Figure 10:
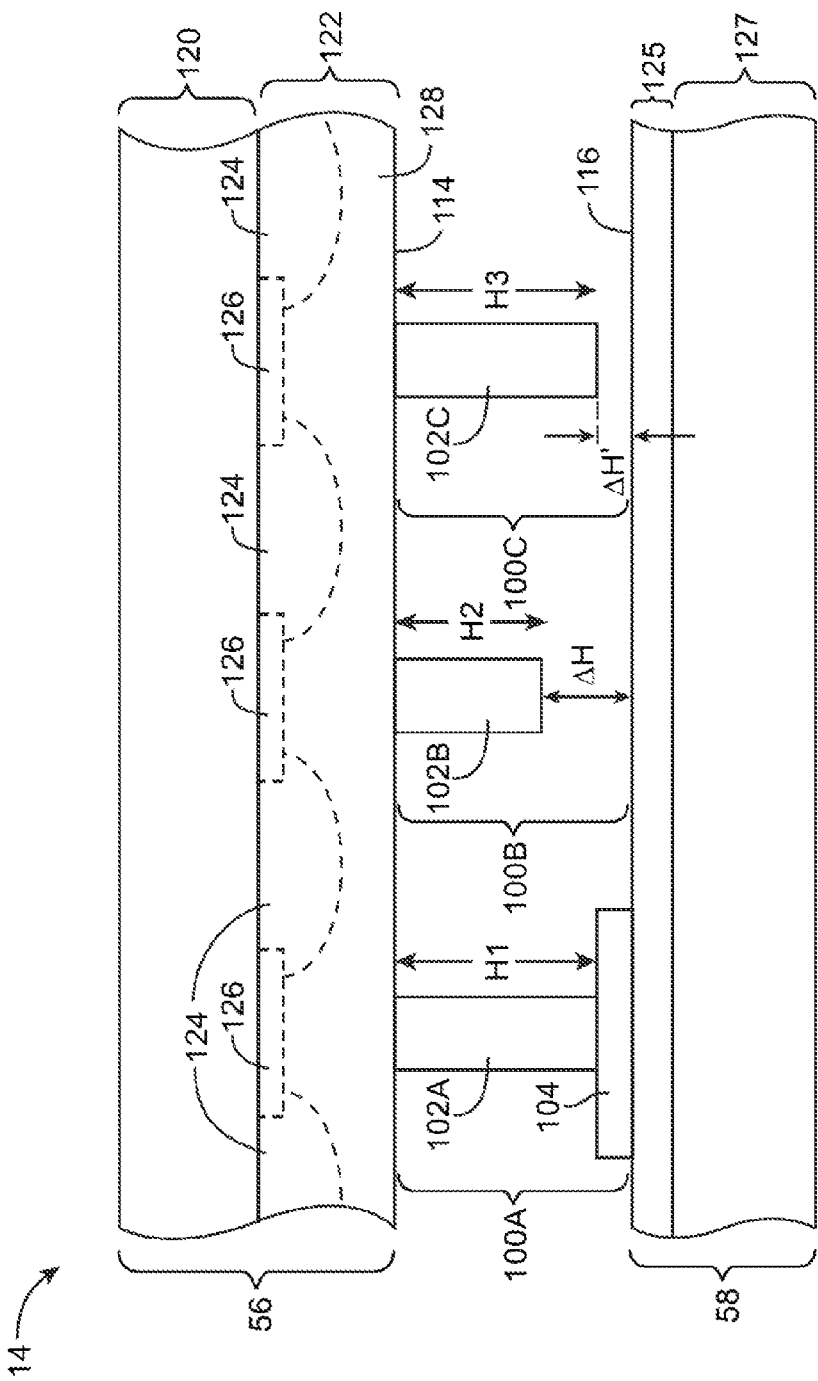
FIG. 10 is a cross-sectional side view of a portion of an illustrative display having column spacer structures of different thicknesses in accordance with an embodiment of the present invention.

FIG. 10 is a cross-sectional side view of a portion of display 14 in a configuration in which there are three different types of column spacer structures between color filter layer 56 and thin-film transistor layer 58. As shown in FIG. 10, color filter layer 56 may include substrate 120 and color filter element array 122. Substrate 120 may be formed from a transparent planar member such as a clear layer of glass or plastic. Color filter array 122 may be formed on the lower surface of substrate 120. Color filter array 122 may contain an array of color filter elements 124 separated by a grid of opaque masking lines such as masking lines 126. Color filter elements 124 may be formed from colored polymers (e.g., red, blue, and green photoresist elements). Covering layers 128 may be clear material (e.g., polymer material). Thin-film transistor layer 58 may be formed from a layer of thin-film transistor circuitry 125 (e.g., transistors formed from thin film layers, electrodes, patterned signal lines, capacitors, and other display pixel array circuitry). Thin-film transistor circuitry 125 may be formed on thin-film transistor substrate 127. Substrate 127 may be a layer of clear glass, plastic, or other material. Coatings (e.g., polymer coating layers) may be formed on the surfaces of color filter layer 56 and thin-film transistor layer 58 (e.g., coatings that cover pad structures on these surfaces).

Column spacer structures 100A, 100B, and 100C may be formed by depositing column spacers on surface 114 of color filter layer 56 such as column spacers 102A, 102B, and 102C. One or more masks (e.g., binary masks, halftone masks, and/or grayscale masks) may be used in forming photoresist pillars (column spacers) of different thicknesses. Landing pads such as landing pad 104 and other pad structures may overlap column spacers such as column spacer 102A and may be used to prevent scratches in the surfaces of the display layers and/or to make desired thickness adjustments in the column spacer structures. Metal or other materials may be used in forming pads.

In display 14, there are generally numerous column spacer structures such as column spacer structures 100A, numerous column spacer structures such as column spacer structures 100B, and numerous column spacer structures such as column spacer structures 100C and structures 100A, 100B, and 100C are generally distributed uniformly across the surface of display 14. The portion of display 14 shown in FIG. 10 in which there is a single one of each of these types of column spacer structures is merely illustrative.

Column spacers 102A, 102B, and 102C have different thicknesses (sometimes referred to as heights). For example, column spacer 102A of FIG. 10 may have a thickness (height) H1, column spacer 102B of FIG. 10 may have a thickness (height) H2, and column spacer 102C of FIG. 10 may have a thickness (height) H3. The values of H1, H2, and H3 may all be different (as an example).

Column spacer structures 100A (and column spacers 102A) may sometimes be referred to as main column spacer structures (or main column spacers). As shown in FIG. 10, main column spacer structures 100A extend between lower surface 114 of color filter layer 56 and upper surface 116 of thin-film transistor layer 58, so that there is no gap in the column spacer structures. The main column spacer structures 100A therefore define the separation distance between color filter layer 56 and thin-film transistor layer 58 in which liquid crystal material 52 is placed.

Column spacer structures 100B do not extend all the way between surface 114 on color filter layer 56 and surface 116 on thin-film transistor layer 58 and are therefore sometimes referred to as subspacers. As shown in FIG. 10, column subspacer structures 100B are free of metal pads such pad 104. There is a gap $\Delta H$ between subspacer column spacer 102B and upper surface 116 of thin-film transistor layer 58. In conditions in which the temperature of liquid crystal material 52 (FIG. 5) changes, color filter layer 56 may deform towards thin-film transistor layer 58. Color filter layer 56 may also be deformed toward thin-film transistor layer 58 when pressure is applied to color filter layer 56. In situations such as these, gap $\Delta H$ temporarily disappears because the lower surface of column spacer 102B comes into contact with surface 116 of thin-film transistor layer. The presence of column spacer structures 100B is therefore used to arrest motion of color filter layer 56 to prevent color filter layer 56 and thin-film transistor layer 58 from contacting one another during use of display 14.

Column spacer structures 100C form a gap $\Delta H'$ that is intermediate in size between the size of gap $\Delta H$ associated with subspacer column spacer structures 100B and the zero gap size associated with main column spacer structures 100A. The thickness of column spacer structures 100C also lies between the thickness of main column spacer structures 100A and the thickness of subspacer column spacer structures 100B. Column spacer structures 100C may therefore sometimes be referred to as intermediate column spacer structures, intermediate thickness column spacer structures, or transitional column spacer structures.

Intermediate column spacer structures 100C are thicker than subspacer structures 100B (e.g., intermediate column spacers 102 are thicker than subspacer column spacers 102B) and therefore provide more support for the layers of display 14 than subspacer column spacers 100B. This can help display 14 resist undesired pooling mura. As shown in FIG. 10, intermediate column spacer structures 100C may have intermediate thickness column spacers 102C of thickness H3 that are separated from surface 116 of thin-film transistor layer 158 by gap $\Delta H'$ (which is different than $\Delta H$).

Figure 11:
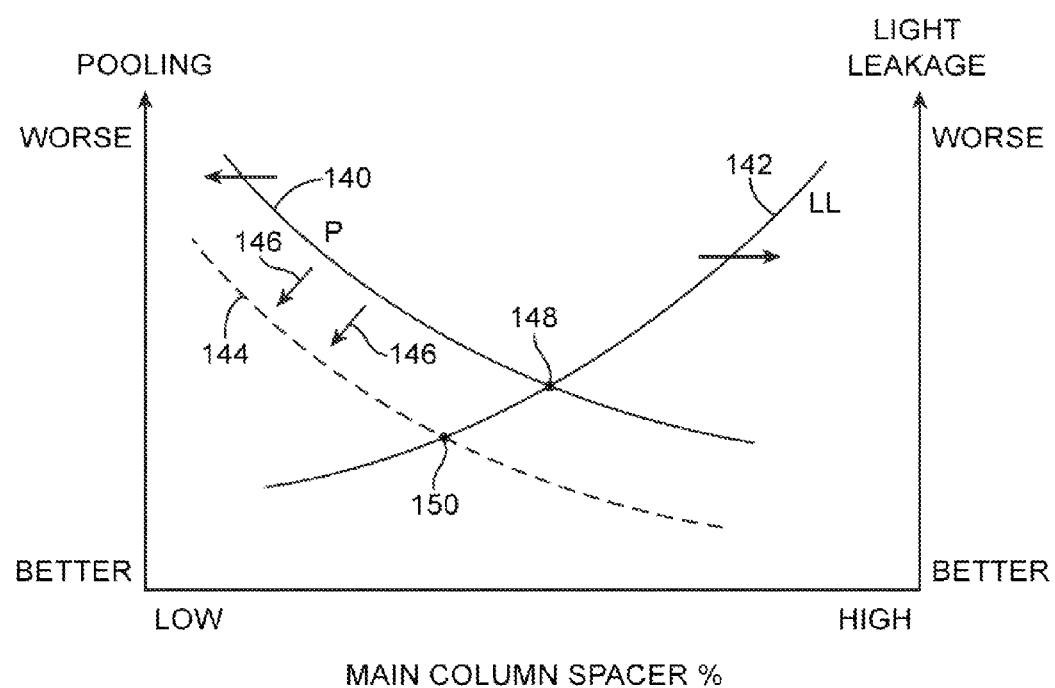
FIG. 11 is a graph in which pooling and light leakage performance values have been plotted as a function of main column spacer density in accordance with an embodiment of the present invention.

There are generally tradeoffs to be considered between light leakage performance and pooling performance in a display such as display 14 of FIG. 10. FIG. 11 is a graph in which pooling performance has been plotted on the left-hand vertical axis as a function of main column spacer concentration and in which light leakage performance has been plotted on the right-hand vertical axis as a function of main column spacer concentration.

Pooling mura curve 140 illustrates how pooling performance tends to degrade as the concentration of main column spacers in a display decreases. This is because the column spacer structures in a display help to prevent layers 56 and 58 from coming into contact with each other. By providing a sufficient number of main column spacers, pooling performance can be improved, as indicated by the downward slope of curve 140 in of FIG. 11.

Light leakage curve 142 illustrates how stress-induced birefringence and therefore light leakage tends to become worse as the number of main column spacers in a display increases. For a given deformation in the planarity of display 14, stress tends to rise in proportion to the stiffness of the display. Displays with fewer main column spacers are more flexible than displays with more column spacers. As a result, displays with fewer main column spacers develop less stress when deformed and produce correspondingly less stress-induced birefringence and light leakage (undesired localized brightening of the display). This behavior is reflected by the upwards slope of curve 142. When fewer main column spacers are present (near the left-hand side of curve 142 in FIG. 11), light leakage performance is better. When more main column spacers are present (near the right-hand side of curve 142 in FIG. 11), light leakage performance is worse.

The inclusion of intermediate thickness column spacer structures such as column spacer structures 100C that have thicknesses greater than that of subspacer structures 100B enhances pooling mura performance by providing additional structural support for the layers of display 14 during temperature changes and other forces that exert bending pressure on layers such as color filter layer 56 without causing excessive stiffness of the type that may result by increasing the number of main column spacers 102A in display 14. The benefit of including intermediate thickness column spacer structures such as column spacer structures 100C of FIG. 10 into display 14 is illustrated by dashed curve 144.

As illustrated by arrows 146, curve 144 represents an improvement over curve 140 resulting from the inclusion of intermediate column spacers. When trading off light leakage performance against pooling mura performance in a display without intermediate column spacer structures 100C, a display might be configured to use the number of main column spacers associated with point 148 of the graph of FIG. 11. When trading off light leakage performance against pooling mura performance in a display with intermediate column spacer structures 100C, in contrast, a display might be configured to use the number of main column spacers associated with point 150 of the graph of FIG. 11. When display 14 is configured in accordance with point 150, both pooling mura performance and light leakage performance can be improved relative to a display configured in accordance with point 148.

FIG. 12 is a table showing illustrative numbers (in percentages) of main column spacer density, intermediate column spacer density, and subspacer column spacer density that may be used in display 14. The table of FIG. 12 also shows illustrative thicknesses for column spacers 102A, 102B, and 102C and shows illustrative gap sizes Δ (zero for the main column spacers, non-zero for the intermediate column spacers and subspacers).

Figure 13:
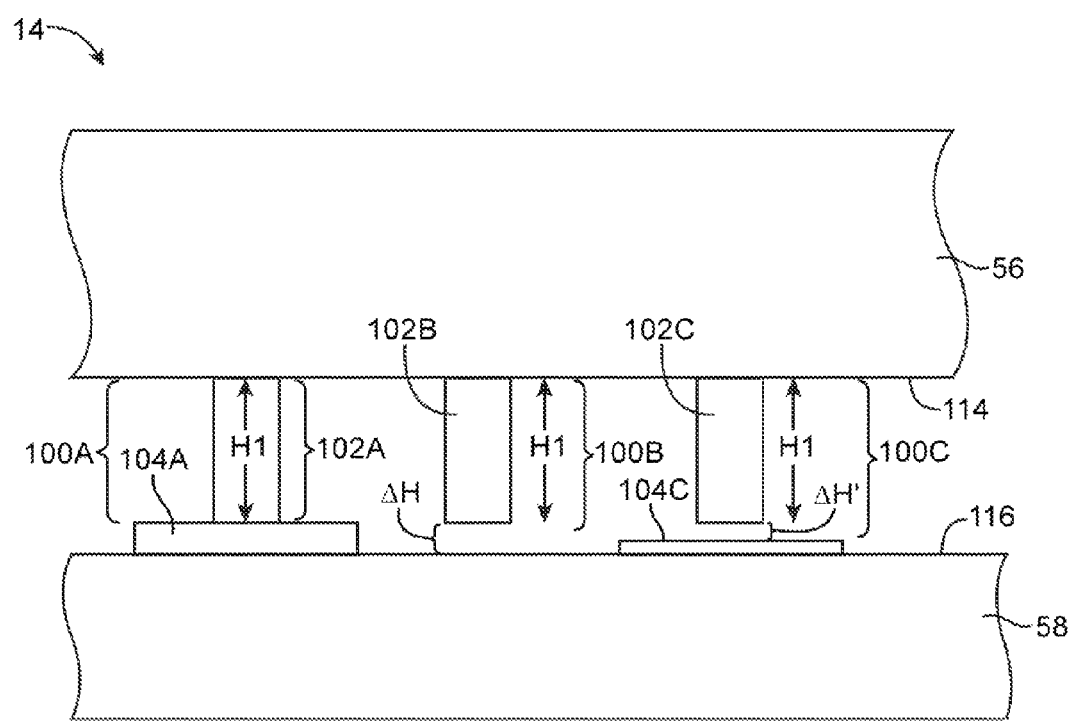
FIG. 13 is a cross-sectional side view of a portion of a display having main column spacer structures, subspacer structures, and intermediate column spacer structures using pads of different thicknesses on the surface of a thin-film transistor layer in accordance with an embodiment of the present invention.

If desired, column spacer structures can use upper and/or lower pads (e.g., metal pads) and/or column spacers of different thicknesses to achieve desired overall thicknesses for the column spacer structures. Consider, as an example, the arrangement of FIG. 13. In this configuration, main column spacer structures 100A are formed from main column spacers 102A on surface 114 of color filter layer 56 and landing pad 104 on surface 116 of thin-film transistor layer 58. Subspacer column spacer structures 100B are formed from subspacer 102B on surface 114 of color filter layer 56. Intermediate column spacer structures 100C of FIG. 13 are formed from intermediate column spacer 102C and pad 104C on surface 116 of thin-film transistor layer 58. The thickness of spacers 102A, 102B, and 102C may, if desired, all be equal (H1).

In the example of FIG. 13, two types of pads are being used—pads such as pad 104A serve as part of the main column spacer structures for display 14 and pads such as pad 104C serve as part of the intermediate column spacer structures for display 14. Other combinations of pads may be used in the column spacer structures if desired (see, e.g., FIGS. 6, 7, 8, and 10). The example of FIG. 14 in which two different thicknesses of pads on surface 116 of thin-film transistor layer are used in two different types of column spacer structures is merely illustrative.

Figure 14:
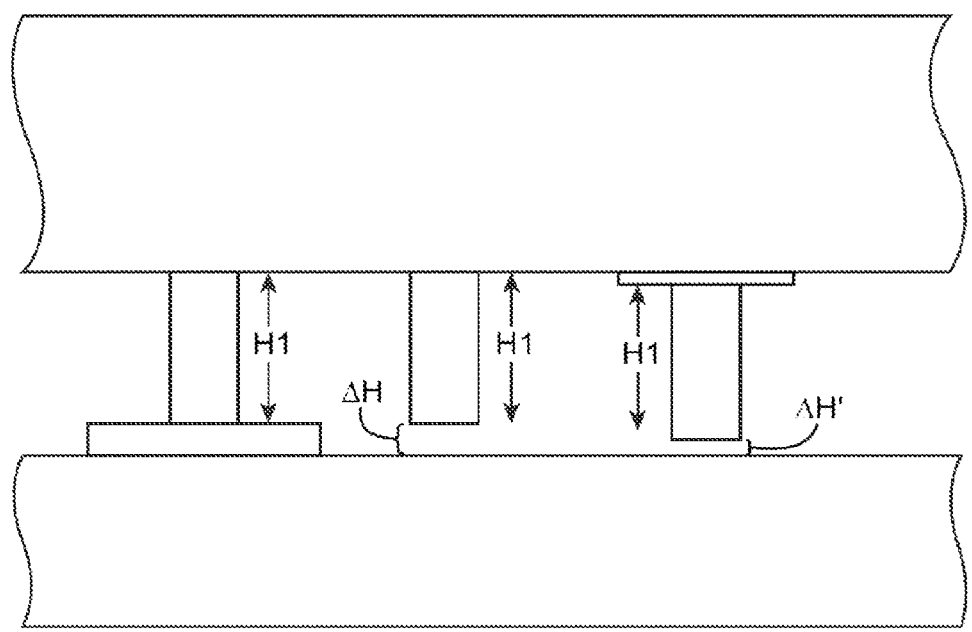
FIG. 14 is a cross-sectional side view of a portion of a display having main column spacer structures, subspacer structures, and intermediate column spacer structures using pads of different thicknesses on the surface of a thin-film transistor layer and on the surface of a color filter layer in accordance with an embodiment of the present invention.

FIG. 14 is a cross-sectional side view of a portion of display 14 in a configuration in which the thickness H1 of each column spacer is the same and in which pad 104C has been formed on surface 114 of color filter layer 56. In general, pads may be formed on surface 114, on surface 116, or on a combination of surfaces 114 and 116. If desired, subspacer column spacer structures 100B (and/or structures 100A and/or structures 100C) may include one or more pads, as described in connection with FIGS. 6, 7, and 8.

Figure 15:
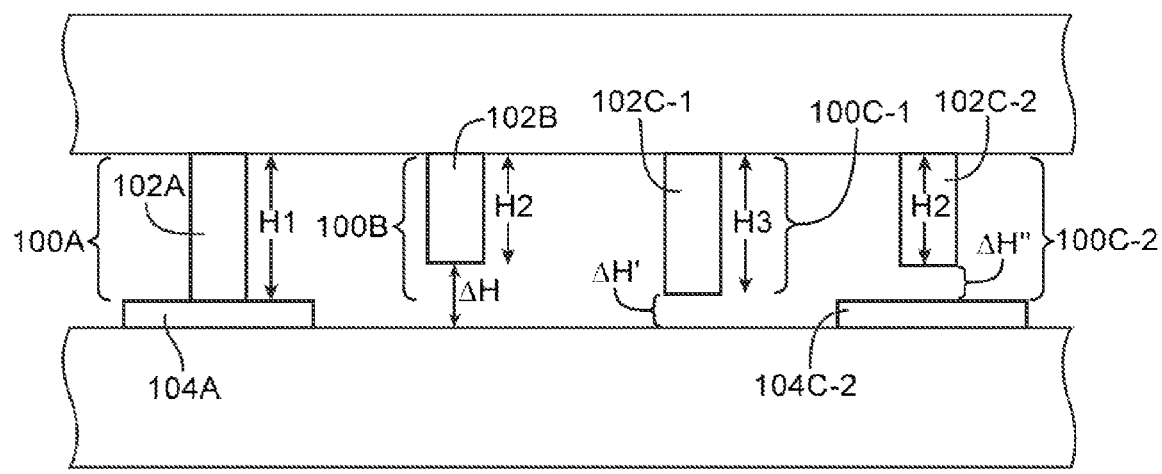
FIG. 15 is a cross-sectional side view of a portion of a display having main column spacer structures, subspacer structures, and two different types of intermediate column spacer structures with respective first and second intermediate column spacer thicknesses in accordance with an embodiment of the present invention.

The example of FIG. 15 involves the use of four different types of column spacer structure. In addition to main column spacer structures 100A and subspacer column spacer structures 100B, the column spacer structures of FIG. 15 include first and second intermediate column spacer structures 100C-1 and 100C-2, each with a different respective thickness. In the FIG. 15 example, main column spacer structures 100A are formed from main column spacer 102A and main column spacer pad 104A and subspacer column spacer structures 100B are formed from subspacer column spacer 102B (without a pad). Intermediate column spacer structures 100C-1 have been formed without using a pad by using intermediate column spacer 102C-1 of thickness H3. Intermediate column spacer structures 100C-2 are formed from a column spacer 102C-2 of thickness H2, which is the same as the thickness of subspacer column spacer 102B and which is different from main column spacer thickness H1 of main column spacer 102A. Pad 104C-2 and spacer 102C-2 contribute to the overall thickness of column spacer structures 100C-2. To provide two different levels of intermediate column support for display 14, the thickness of intermediate column spacer structures 100C-1 is preferably different than the thickness of intermediate column spacer structures 100C-2.

The foregoing is merely illustrative of the principles of this invention and various modifications can be made by those skilled in the art without departing from the scope and spirit of the invention.

What is claimed is:

1. A display, comprising:
   a color filter layer;
   a thin-film transistor layer;
   a layer of liquid crystal material between the color filter layer and the thin-film transistor layer; and
   a plurality of column spacer structures between the color filter layer and the thin-film transistor layer, wherein the column spacer structures include first column spacer structures of a first thickness, second column spacer structures of a second thickness, and third column spacers of a third thickness that is between the first and second thicknesses, and wherein a density of the third column spacers in the display is less than a density of the second column spacers in the display.

2. The display defined in claim 1 wherein the column spacer structures include fourth column spacer structures of a fourth thickness that is between the first and third thicknesses.

3. The display defined in claim 2 wherein at least some of the column spacer structures include photoresist pillars and metal pads.

4. A display, comprising:
   a first display layer;
   a second display layer; and
   a layer of liquid material between the first and second display layers, wherein the first and second display layers are separated by a distance; and
   spacer structures between the first and second display layers that include first spacer structures of a first thickness, second spacer structures of a second thickness, and third spacers of a third thickness that is between the first and second thicknesses, wherein the first thickness is equal to the distance, and wherein the second spacer structures cover a greater area of the display than the third spacers.

5. The display defined in claim 4 wherein the spacer structures include polymer structures and metal pads.

6. The display defined in claim 5 wherein the polymer structures comprise first polymer structures in the first spacer structures, second polymer structures in the second spacer structures, and third polymer structures in the third spacer structures and wherein the first, second, and third polymer structures have equal thicknesses.

7. A display, comprising:
   a color filter layer having a lower surface;
   a thin-film transistor layer having an upper surface;
   a liquid crystal layer between the lower surface and the upper surface; and
   a plurality of column spacers between the color filter layer and the thin-film transistor layer, wherein first and second column spacers of the plurality of column spacers have respective first and second metal pads, and wherein the first and second metal pads have different thicknesses.

8. The display defined in claim 7 wherein the plurality of column spacers comprises a main column spacer, a subspacer column spacer, and an intermediate column spacer, wherein the first metal pad is associated with the main column spacer and has a first thickness, and wherein the second metal pad is associated with the intermediate column spacer and has a second thickness that is less than the first thickness.

9. The display defined in claim 8 wherein no metal pads are positioned beneath the subspacer column spacer.

10. The display defined in claim 9 wherein the first and second metal pads are located on the upper surface of the thin-film transistor layer.

11. The display defined in claim 9 wherein the first or second metal pad is located on the lower surface of the color filter layer.

12. The display defined in claim 9 wherein the plurality of column spacers comprises an additional intermediate column spacer that has a third metal pad with a third thickness, wherein the third thickness is less than the first thickness, and wherein the third thickness is different than the second thickness.

13. The display defined in claim 12 wherein the main column spacer is formed on the lower surface of the color filter layer.

14. The display defined in claim 12 wherein the subspacer column spacer is formed on the lower surface of the color filter layer.

15. The display defined in claim 14 wherein the intermediate column spacer is formed on the lower surface of the color filter layer.

16. The display defined in claim 14 wherein the second metal pad is formed on the lower surface of the color filter layer, and wherein the intermediate column spacer is formed on the second metal pad.

17. The display defined in claim 14 wherein the main column spacer, intermediate column spacer, and the subspacer column spacer all have the same thickness.

18. The display defined in claim 7 wherein the plurality of column spacers comprises main column spacers, subspacer column spacers, and intermediate column spacers, wherein the main column spacers are associated with main metal pads that have a first thickness, and wherein the intermediate column spacers are associated with intermediate metal pads that have a second thickness that is less than the first thickness.

19. The display defined in claim 18 wherein the density of the intermediate metal pads is less than the density of the main metal pads.

* * * * *